US010714129B1

(12) United States Patent
Tang et al.

(10) Patent No.: US 10,714,129 B1
(45) Date of Patent: Jul. 14, 2020

(54) WRITER WITH RECESSED SPIN FLIPPING ELEMENT IN THE MAIN POLE SURROUNDING GAP

(71) Applicant: Headway Technologies, Inc., Milpitas, CA (US)

(72) Inventors: Yuhui Tang, Milpitas, CA (US); Ying Liu, San Jose, CA (US)

(73) Assignee: Headway Technologies, Inc., Mipitas, CA (US)

( * ) Notice: Subject to any disclaimer, the term of this patent is extended or adjusted under 35 U.S.C. 154(b) by 0 days.

(21) Appl. No.: 16/372,517

(22) Filed: Apr. 2, 2019

(51) Int. Cl.
*G11B 5/127* (2006.01)
*G11B 5/187* (2006.01)
*G11B 5/48* (2006.01)
*G11B 5/115* (2006.01)
*G11B 5/35* (2006.01)
*G11B 5/31* (2006.01)
*G11B 5/23* (2006.01)
(Continued)

(52) U.S. Cl.
CPC ............. *G11B 5/187* (2013.01); *G11B 5/115* (2013.01); *G11B 5/1278* (2013.01); *G11B 5/23* (2013.01); *G11B 5/235* (2013.01); *G11B 5/314* (2013.01); *G11B 5/315* (2013.01); *G11B 5/3133* (2013.01); *G11B 5/3143* (2013.01); *G11B 5/3146* (2013.01); *G11B 5/35* (2013.01); *G11B 5/4826* (2013.01); *G11B 2005/0024* (2013.01)

(58) Field of Classification Search
None
See application file for complete search history.

(56) References Cited

U.S. PATENT DOCUMENTS 6,785,092 B2   8/2004  Covington et al.
6,809,899 B1  10/2004  Chen et al.
(Continued)

FOREIGN PATENT DOCUMENTS

JP   2002-133610    5/2002
JP   2002-298309   10/2002
(Continued)

OTHER PUBLICATIONS

PTO Office Action, Application No. 12/964,202, Applicant: Sasaki et al., Notification dated Nov. 28, 2012, 11 pages.
(Continued)

*Primary Examiner* — William J Klimowicz
(74) *Attorney, Agent, or Firm* — Saile Ackerman LLC; Stephen B. Ackerman

(57) ABSTRACT

A microwave assisted magnetic recording writer has a main pole (MP) with a write gap formed between the MP trailing side and a trailing shield, a side gap between each MP side and a side shield, and a leading gap between the MP leading side and a leading shield. A spin torque oscillator (STO) is formed in at least each side gap and recessed from the air bearing surface to reduce wear. Each STO has a flux guiding layer (FGL) with a magnetization that flips to a direction substantially opposite to the gap field when a current of sufficient density is applied from the adjacent shield towards the MP thereby forcing additional flux out of the MP at the ABS to enhance writability on a magnetic recording medium. Accordingly, the gap between the recessed STO and ABS is reduced to provide enhanced area density capability without sacrificing overwrite.

14 Claims, 14 Drawing Sheets

(51) Int. Cl.
*G11B 5/235* (2006.01)
*G11B 5/00* (2006.01)

(56) References Cited

U.S. PATENT DOCUMENTS

| | | | |
|---|---|---|---|
| 6,954,340 | B2 | 10/2005 | Shukh et al. |
| 7,009,812 | B2 | 3/2006 | Hsu et al. |
| 7,589,600 | B2 | 9/2009 | Dimitrov et al. |
| 7,724,469 | B2 | 5/2010 | Gao et al. |
| 7,835,111 | B2 | 11/2010 | Flint et al. |
| 7,957,098 | B2 | 6/2011 | Yamada et al. |
| 7,963,024 | B2 | 6/2011 | Neuhaus |
| 7,978,442 | B2 | 7/2011 | Zhang et al. |
| 7,982,996 | B2 | 7/2011 | Smith et al. |
| 8,027,110 | B1 | 9/2011 | Yamanaka et al. |
| 8,064,244 | B2 | 11/2011 | Zhang et al. |
| 8,068,312 | B2 | 11/2011 | Jiang et al. |
| 8,154,825 | B2 | 4/2012 | Takashita et al. |
| 8,203,389 | B1 | 6/2012 | Zhou et al. |
| 8,264,792 | B2 | 9/2012 | Bai et al. |
| 8,270,112 | B2 | 9/2012 | Funayama et al. |
| 8,295,008 | B1 | 10/2012 | Sasaki et al. |
| 8,310,787 | B1 | 11/2012 | Sasaki et al. |
| 8,320,079 | B2 | 11/2012 | Iwasaki et al. |
| 8,427,781 | B1 | 4/2013 | Sasaki et al. |
| 8,446,690 | B2 | 5/2013 | Alex et al. |
| 8,462,461 | B2 | 6/2013 | Braganca et al. |
| 8,477,452 | B2 | 7/2013 | Sasaki et al. |
| 8,493,687 | B2 | 7/2013 | Sasaki et al. |
| 8,582,240 | B1 | 11/2013 | Chen et al. |
| 8,582,241 | B1 | 11/2013 | Yu et al. |
| 8,604,886 | B2 | 12/2013 | Nikonov et al. |
| 8,634,163 | B2 | 1/2014 | Tanabe et al. |
| 8,749,919 | B2 | 6/2014 | Sasaki et al. |
| 8,767,347 | B1 | 7/2014 | Sasaki et al. |
| 8,792,210 | B2 | 7/2014 | de la Fuente et al. |
| 9,142,228 | B2 | 9/2015 | Fujita et al. |
| 9,202,528 | B2 | 12/2015 | Furukawa et al. |
| 9,230,571 | B1 | 1/2016 | Chen et al. |
| 9,299,367 | B1 | 3/2016 | Tang et al. |
| 9,361,912 | B1 | 6/2016 | Liu et al. |
| 9,406,316 | B2 | 8/2016 | Urakami et al. |
| 9,406,317 | B1 | 8/2016 | Tang et al. |
| 9,466,319 | B1 | 10/2016 | Tang et al. |
| 9,792,933 | B2 | 10/2017 | Koizumi et al. |
| 9,824,701 | B2 | 11/2017 | Tang et al. |
| 9,934,797 | B2 | 4/2018 | Takahashi et al. |
| 9,966,091 | B2 | 5/2018 | Chen et al. |
| 10,032,469 | B2 | 7/2018 | Lim et al. |
| 10,032,470 | B1 | 7/2018 | Degawa et al. |
| 10,037,772 | B2 | 7/2018 | Okamura et al. |
| 10,325,618 | B1* | 6/2019 | Wu .......... G11B 5/11 |
| 10,446,178 | B1* | 10/2019 | Tang .......... G11B 5/21 |
| 10,490,216 | B1* | 11/2019 | Chen .......... G11C 11/16 |
| 2002/0034043 | A1 | 3/2002 | Okada et al. |
| 2004/0150910 | A1 | 8/2004 | Okada et al. |
| 2005/0128637 | A1 | 6/2005 | Johnston et al. |
| 2005/0141137 | A1 | 6/2005 | Okada |
| 2006/0044682 | A1 | 3/2006 | Le et al. |
| 2006/0087765 | A1 | 4/2006 | Iwakura et al. |
| 2006/0103978 | A1 | 5/2006 | Takano et al. |
| 2007/0177301 | A1 | 8/2007 | Han et al. |
| 2008/0013209 | A1 | 1/2008 | Sasaki et al. |
| 2008/0088972 | A1 | 4/2008 | Sasaki et al. |
| 2009/0059426 | A1 | 3/2009 | Sasaki et al. |
| 2009/0080106 | A1 | 3/2009 | Shimizu et al. |
| 2009/0128953 | A1 | 5/2009 | Jiang et al. |
| 2009/0296275 | A1 | 12/2009 | Sasaki et al. |
| 2010/0165517 | A1 | 7/2010 | Araki et al. |
| 2011/0211271 | A1 | 9/2011 | Ng et al. |
| 2012/0292723 | A1 | 11/2012 | Luo et al. |
| 2014/0071562 | A1 | 3/2014 | Chen et al. |
| 2014/0177092 | A1 | 6/2014 | Katada et al. |
| 2015/0043106 | A1 | 2/2015 | Yamada et al. |
| 2015/0092292 | A1* | 4/2015 | Furukawa .......... G11B 33/1433 360/59 |
| 2016/0035375 | A1* | 2/2016 | Gao .......... G11B 5/35 360/125.3 |
| 2016/0218728 | A1 | 7/2016 | Zhu |
| 2017/0092304 | A1 | 3/2017 | Kozumi et al. |
| 2017/0133044 | A1 | 5/2017 | Lim et al. |
| 2018/0075868 | A1 | 3/2018 | Koui et al. |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

\* cited by examiner

WRITER WITH RECESSED SPIN FLIPPING ELEMENT IN THE MAIN POLE SURROUNDING GAP

RELATED PATENT APPLICATIONS

This application is related to the following: U.S. Patent publication 2017/0133044; U.S. Pat. Nos. 10,325,618; 10,446,178; and 10,490,216; assigned to a common assignee and herein incorporated by reference in their entirety.

TECHNICAL FIELD

The present disclosure relates to a design for a microwave assisted magnetic recording (MAMR) writer wherein a spin flipping element comprised of a flux generation layer is sandwiched between a spin preserving layer and a non-spin preserving layer in all or part of the gap surrounding the main pole, and is recessed behind the air bearing surface (ABS), and has a magnetic moment that flips to an opposite direction when a current of sufficient magnitude is applied across the gap during a write process thereby increasing the reluctance in one or more of the write gap (WG), side gap (SG), and leading gap (LG), and forcing additional flux out of the main pole (MP) tip at the ABS to enhance the write field on the magnetic recording medium.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. One approach that is currently being investigated is microwave assisted magnetic recording (MAMR), which is described by J-G. Zhu et al. in "Microwave Assisted Magnetic Recording", IEEE Trans. Magn., vol. 44, pp. 125-131 (2008). Although MAMR has been in development for a number of years, it is not shown enough promise to be introduced into any products yet because of several technical problems. One problem is a fringing growth when the spin torque oscillator (STO) bias is turned on. Thus, when a STO layer is inserted into the write gap, and magnetization therein is flipped to be anti-parallel to the magnetic field in the gap, the reluctance in the gap is increased, and write field as well as the return field to the trailing shield are boosted. However, fringing will grow as the write field increases, and dramatically decrease the writer tracks per inch (TPI) capability.

Spin transfer (spin torque) devices are based on a spin-transfer effect that arises from the spin dependent electron transport properties of ferromagnetic-non-magnetic spacer-ferromagnetic multilayers. When a spin-polarized current passes through a magnetic multilayer in a CPP (current perpendicular to plane) configuration, the magnetic moment of electrons incident on a ferromagnetic layer interacts with magnetic moments of the ferromagnetic layer near the interface between the ferromagnetic and non-magnetic spacer. Through this interaction, the electrons transfer a portion of their angular momentum to the ferromagnetic layer. As a result, spin-polarized current can switch the magnetization direction of the ferromagnetic layer if the current density is sufficiently high.

In a MAMR writer, the main pole generates a large local magnetic field to change the magnetization direction of the medium in proximity to the writer. By switching the direction of the field using a switching current that drives the writer, one can write a plurality of media bits on a magnetic recording medium. In MAMR, a STO has a ferromagnetic layer called a field generation layer (FGL) wherein a magnetization is driven into a precessional state when spin torque is applied. As a result, a RF field is generated on the magnetic medium and induces a precessional state in one or more bit magnetizations, which lowers the coercivity therein and reduces the MP field and switching current necessary for a write process.

Magnetic flux in the main pole proceeds through the ABS and into a medium bit layer and soft underlayer (SUL). In some common designs, the flux returns to the write head through a trailing side loop comprised of a trailing shield structure, and through a leading side loop that includes a leading shield and back gap connection. There is also a gap field flux that exits the main pole through the write gap, side gaps, and leading gap, and is not directly responsible for writing. It is desirable to reduce the flux through the gap surrounding the MP in order to improve track per inch (TPI) and bits per inch (BPI) capability. Current MAMR writer designs have a STO at the ABS, but STO reliability is a concern because of wear that results from touchdown during multiple write processes. Thus, an improved STO design is needed that improves reliability compared with existing STO devices while maintaining the capacity to increase reluctance in the gap around the MP, and with some applied current densities, generate a RF field on a bit magnetization in a magnetic medium to enable a lower write field.

SUMMARY

One objective of the present disclosure is to provide a STO that increases reluctance in the gap surrounding the MP, and has the capability to generate a RF field (MAMR effect) on a bit magnetization in a magnetic recording medium to improve writability.

A second objective of the present disclosure is to provide a STO according to the first objective that has improved reliability compared with existing STO designs.

According to one embodiment of the present disclosure, these objectives are achieved with a STO that is formed in one or more of the WG, SG, and LG, and is recessed behind the ABS. The MP may be surrounded with an all around shield structure comprised of a trailing shield formed on the WG, a side shield adjoining each SG, and a leading shield below the LG. The STO may have an inner non-spin preserving conductor layer, a middle flux guiding layer (FGL), and an outer spin preserving conductor layer where an "outer" layer is defined as a layer formed a greater distance from the MP than an "inner" layer. A key feature is that the middle FGL has a magnetization that is driven into a precessional (oscillation) state when sufficient spin torque is applied, and flips to direction pointing toward the MP and against the gap field when a current ($I_b$) of sufficient density is applied between the MP and adjacent shield structure. Thus, FGL magnetization flipping increases reluctance in one or more of the WG, SG, and LG. Depending on the precessional cone angle (before or after FGL flipping), a RF field is also generated to provide a MAMR effect that lowers the write field necessary to switch a bit magnetization in the magnetic medium.

Since the STO in each gap is preferably recessed at least 2 nm from the ABS, and up to 400 nm from the ABS, fringing growth is considerably reduced compared with a scheme where the STO is at the ABS. Furthermore, STO reliability is improved because of reduced wear after repeated touchdowns compared with designs where the STO is at the ABS. Less heating in the WG, SG, and LG is also expected because of the recessed STO. Each STO has a height of 10 nm to 500 nm that represents a distance orthogonal to the ABS, and between the recessed front side and the STO backside. STO down-track thickness in the WG or LG is from 1 nm to 100 nm, and cross-track width in the SG is also from 1 nm to 100 nm. Therefore, a front portion of the WG, SG, and LG at the ABS preferably has a width or thickness less than that of a back portion wherein the STO is located, which allows a high STO magnetization saturation x thickness (Mst) and small MP surrounding gap to coexist in the MAMR writer. Accordingly, the high STO Mst compensates for overwrite (OW) loss from the smaller gap size and leads to a net gain of write field gradient around the MP, which in turn results in better TPI and BPI, and larger area density capability (ADC).

In the exemplary embodiments, the STO in each gap has an inner non-spin preserving layer, a middle FGL, and an outer spin preserving layer. However, the present disclosure also anticipates other STO configurations, that were disclosed in related patent applications, will provide similar advantages to those associated with the STO configuration in the exemplary embodiment. In alternative embodiments, the STO may comprise at least a FGL, a spin polarization (SP) layer, and a non-magnetic spacer between the FGL and SP layer.

Preferably, the FGL has a magnetization saturation (Ms) value from 4 kiloGauss (kG) to 24 kG. The non-spin preserving layer may be Ta, Ru, W, Pt, or Ti while the FGL is preferably a single layer or multilayer comprised of $Ni_xFe_{100-x}$, $Co_yFe_{100-y}$, $Co_zNi_{100-z}$, or alloys thereof with one or more additional elements that are B, Mo, W, Pt, Pd, or Cr, and where each of x, y, and z is ≥0 atomic % and ≤100 atomic %. The spin preserving layer is one of Cu, Ag, Au, Cr, and Al.

DETAILED DESCRIPTION

Figure 1:
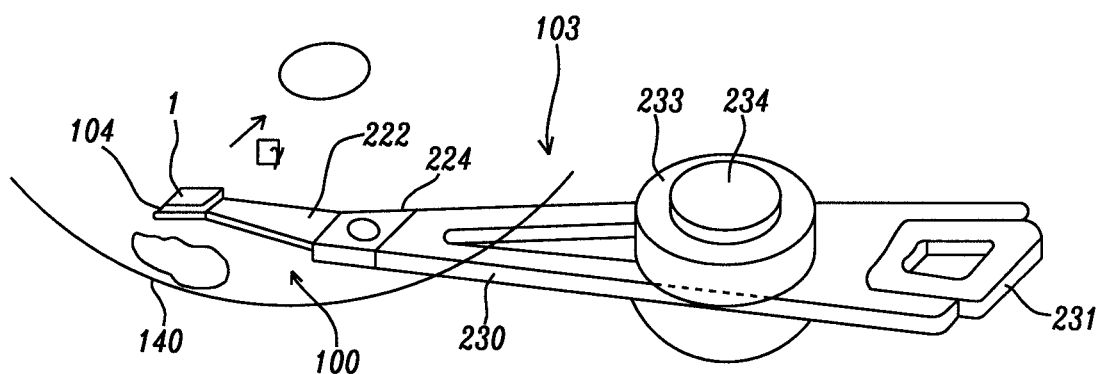
FIG. 1 is a perspective view of a head arm assembly of the present disclosure.

The present disclosure is a MAMR writer structure wherein a STO is formed within one or more of the WG, side gaps, and LG to improve writability, and is recessed behind the ABS to improve reliability. Although the exemplary embodiments relate to a MAMR writer where current is applied from the surrounding shield structure towards the MP, the present disclosure encompasses alternative embodiments (not shown) where the stacking order of the STO layers is reversed and the applied current is from the MP toward the surrounding shield structure. In the drawings, the y-axis is in a cross-track direction, the z-axis is in a down-track direction, and the x-axis is in a direction orthogonal to the ABS and towards a back end of the MAMR writer. Thickness refers to a down-track distance, width is a cross-track distance, and height is a distance from the ABS in the x-axis direction. The terms precessional state and oscillation may be used interchangeably.

The term "behind" refers to an x-axis position of one structural feature with respect to another. For example, component B formed behind component or plane A means that B is at a greater height from the ABS than A. A "front side" of a layer is a side facing the ABS, and a backside or backend faces away from the ABS. The terms "above" and "below" refer to a down-track (DT) position of one layer with respect to a second layer. A "far side" of a layer or outer layer is a greater distance from a MP side than an "inner side" of a layer or an inner layer, respectively.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
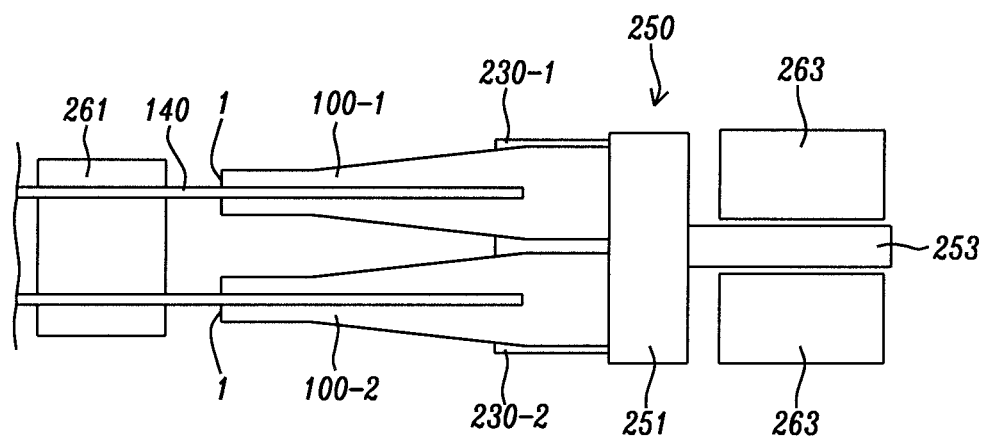
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
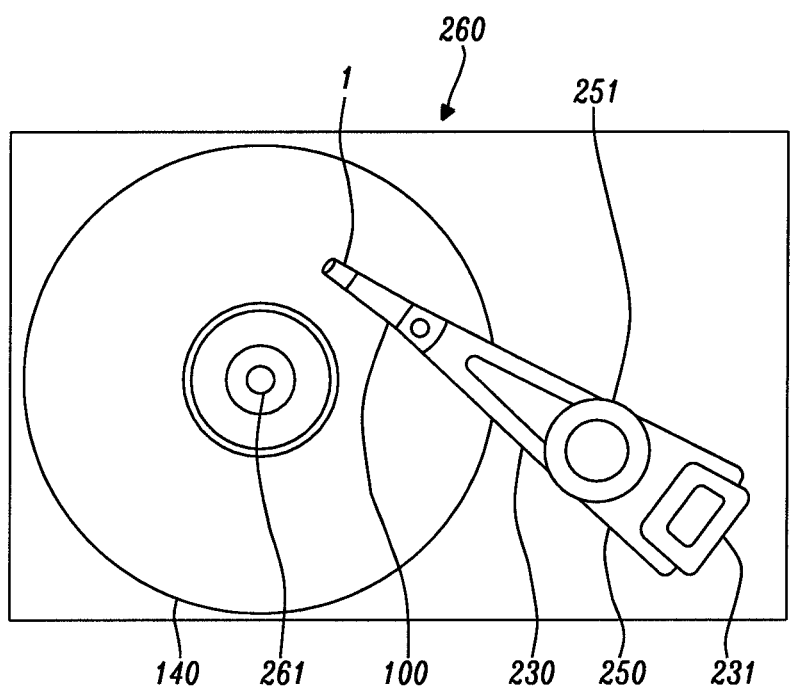
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
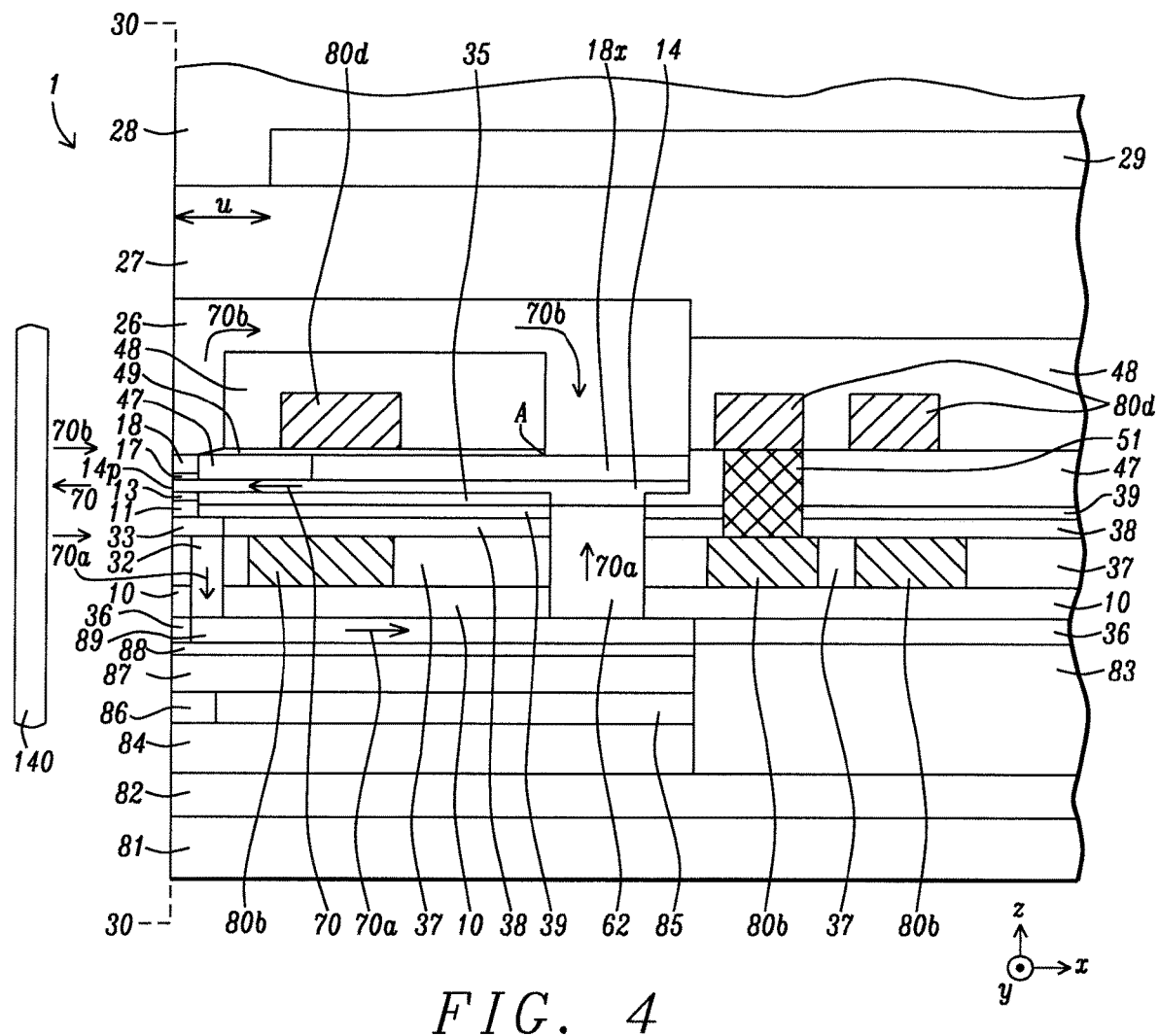
FIG. 4 is an ABS view of an all wrap around (AWA) shield structure surrounding a main pole according to an embodiment of the present disclosure.

Referring to FIG. 4, magnetic recording head 1 comprises a combined read-write head. The down-track cross-sectional view is taken along a center plane (44-44 in FIG. 5A, FIG. 5B, or FIG. 5C) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, a recessed dual write shield with back gap connection (rDWS BGC) base writer is depicted wherein magnetic flux 70 in main pole (MP) layer 14 is generated with flowing a current through bucking coil 80b and driving coil 80d that are below and above the MP layer, respectively, and are connected by interconnect 51. Magnetic flux 70 exits the MP layer at pole tip 14p at the ABS 30-30 and is used to write a plurality of bits on magnetic medium 140. Magnetic flux 70b returns to the MP through a trailing loop comprised of trailing shields 17, 18, PP3 shield 26, and top yoke 18x. There is also a leading return loop for magnetic flux 70a that includes leading shield 11, leading shield connector (LSC) 33, S2 connector (S2C) 32, return path (RTP) 89, and back gap connection (BGC) 62. The magnetic core may also comprise a bottom yoke 35 below the MP layer. Dielectric layers 10, 11, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head. In other embodiments (not shown), the BGC and RTP may be omitted to give a rDWS no BGC base writer structure. Moreover, the LSC and S2C may be omitted to provide a non-DWS (nDWS) base writer structure.

Figure 5A:
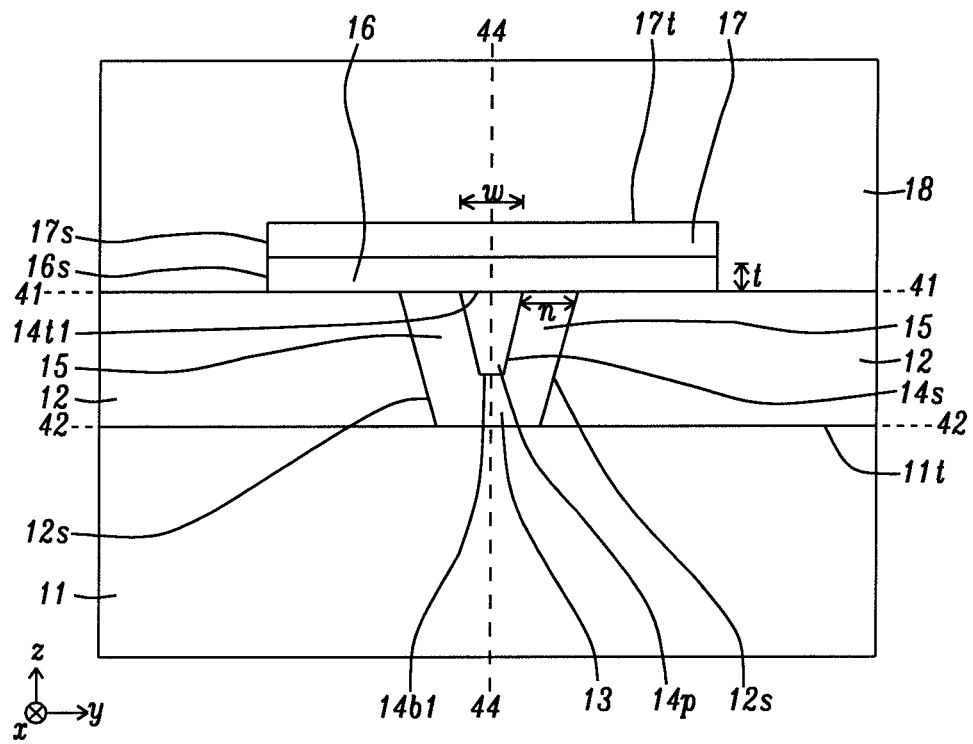
FIG. 5A is an ABS view of a perpendicular magnetic recording (PMR) writer according to a prior art design.

Referring to FIG. 5A, an ABS view of a conventional PMR writer is shown. Main pole (MP) has MP tip 14p having track width w, trailing side 14t1, leading side 14b1, and two sides 14s formed equidistant from a center plane 44-44 that is surrounded by an all wrap around (AWA) shield structure disclosed in related U.S. Patent publication 2017/0133044. There is a WG 16 with thickness t on the MP trailing side, a SG 15 of width n adjoining each MP side, and LG 13 below the MP leading side. The trailing shield structure comprises a first trailing shield (TS) 17 called a hot seed (HS) layer with a high magnetization saturation value from 19 kiloGauss (kG) to 24 kG on the WG. The trailing shield structure also includes a second TS 18 also known as the write shield (WS) formed on the HS top surface 17t and sides 17s, on WG sides 16s, and on a top surface of the side shields 12 at plane 41-41. Plane 41-41 includes the MP trailing side at the ABS. Side shields contact a top surface of the leading shield (LS) 11 at plane 42-42 that is parallel to plane 41-41 and includes the MP leading side at the ABS.

Figure 5B:
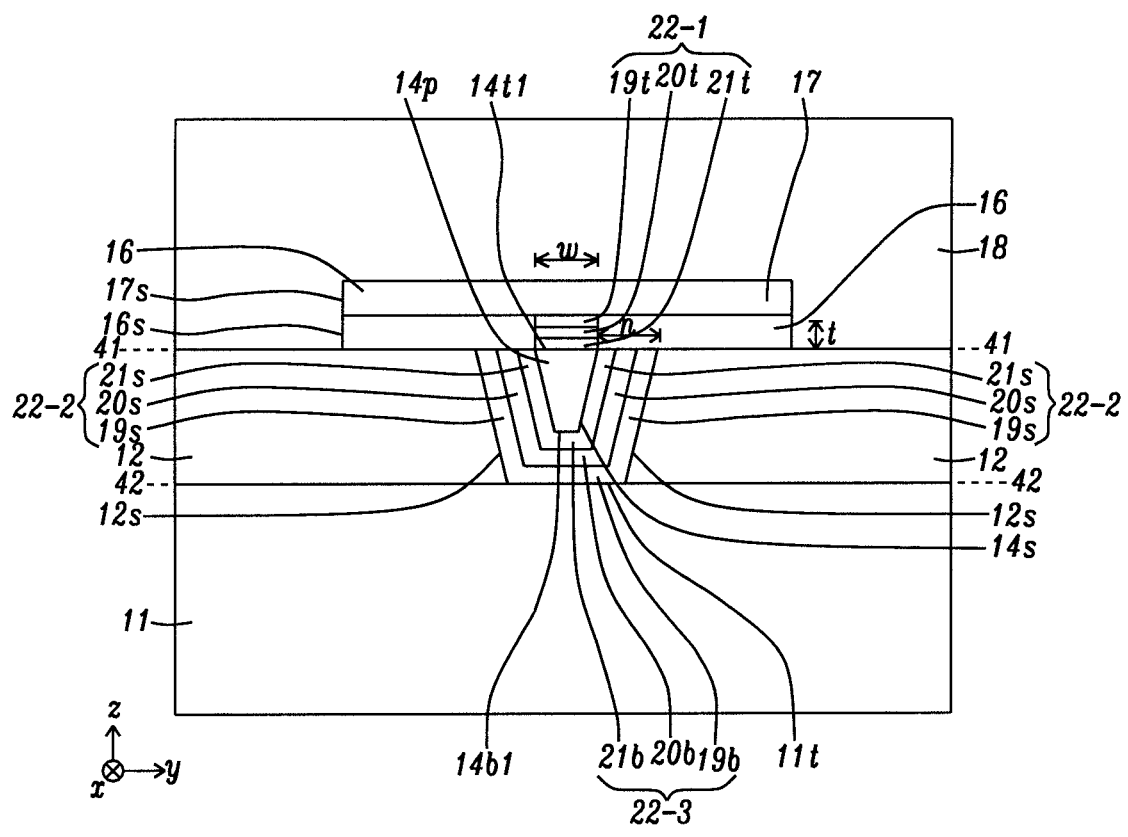
FIG. 5B is an ABS view of a MAMR writer having a STO according to a design known to the inventors.

Referring to FIG. 5B, an ABS view of a MAMR writer disclosed by the inventors in related U.S. Pat. No. 10,325,618 is depicted. A first STO 22-1 with inner non-spin preserving layer 21t, middle FGL 20t, and outer spin preserving layer 19t is formed on MP trailing side 14t1 and in the WG. In the exemplary embodiment, STO 22-1 has a width w that is equivalent to the track width of MP trailing side 14t1, and thickness t. A second STO 22-2 having width n is formed in and fills each side gap and has inner non-spin preserving layer 21s, middle FGL 20s, and outer spin preserving layer 19s. A third STO 22-3 with thickness n is formed on LS top surface 11t, fills the LG, and has the inner non-spin preserving layer 21b, middle FGL 20b, and outer spin preserving layer 19b. Since the STO stack of layers is conformally deposited on side shield sides 12s and the LS top surface, FGL 20b is a continuation of FGL 20s. Likewise, layers 19s, 19b form a continuous spin preserving layer, and layers 21s, 21b form a continuous non-spin preserving layer.

As disclosed in related U.S. Pat. No. 10,325,618, other STO configurations are possible where only STO 22-2 is present in the side gaps but no STO in the leading gap, and where the STO layers are conformal to the side shield sides but are not conformal on the LG. It should also be understood that STO 22-2 and STO 22-3 may be present while STO 22-1 is omitted.

Figure 5C:
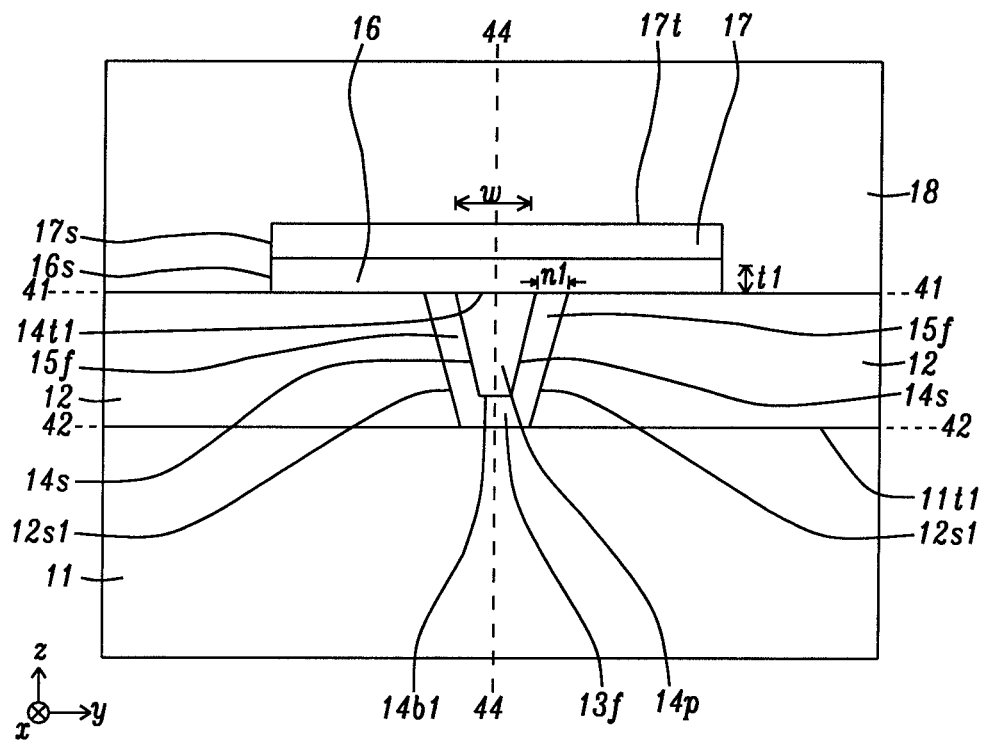
FIG. 5C is an ABS view of a MAMR writer with a recessed STO according to an embodiment of the present disclosure.

According to one embodiment of the present disclosure shown in FIG. 5C, one or more of STO 22-1, 22-2, 22-3 described previously is formed in the WG, each SG, and LG, respectively, and each of the STO devices is recessed behind the ABS and is called STO 22-1r, STO 22-2r, and STO 22-3r, respectively. Furthermore, SG width in a front portion 15f of the SG, and LG thickness in a front portion 13f of the LG are reduced to n1 where n1<n. Thus, a front portion of each side shield 12 that adjoins SG front portion 15f has an inner side 12s1 formed closer to MP side 14s than in the prior art MAMR writer, and LS top surface 11t1 that adjoins the LG front portion 13f is closer to MP leading side 14b1 than in the prior art MAMR writer. Meanwhile, the SG back portion and LG back portion (not shown) in which STO 22-2r and STO 22-3r, respectively, are formed retain width n and thickness n, respectively. WG 16 has thickness t1 at the ABS and a greater thickness t (t>t1) in a back portion of the WG (not shown) in which STO 22-1r is formed.

Figure 6A:
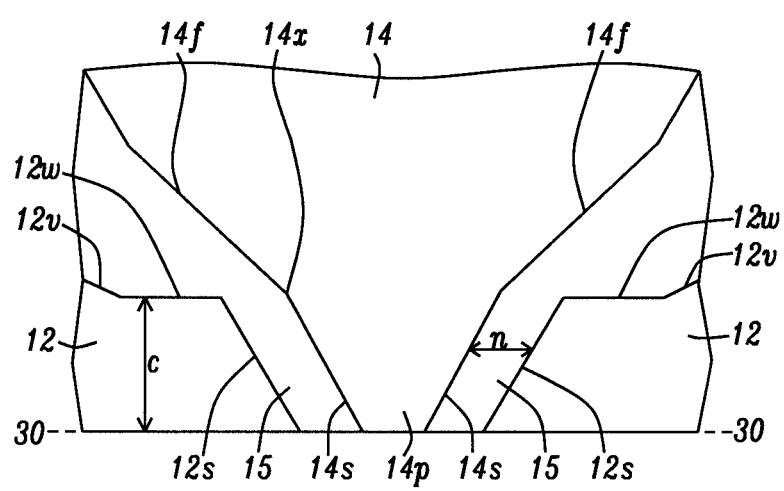
FIG. 6A is a top-down view of the PMR writer in FIG. 5A.

In FIG. 6A, a top-down view of the PMR writer in FIG. 5A is shown. Each SG has a constant width n from the ABS 30-30 to a side shield (SS) side 12w at height c that is substantially parallel to the ABS and connects with SS side 12s proximate to corner 14x where MP side 14s connects with flared MP side 14f. SS side 12s extends from the ABS to height c, which is proximate to the throat height where MP tip 14p adjoins MP layer 14. Each SS typically has a third side 12v that connects to a far end of SS side 12w and extends to a far side (not shown) of the SS at a height greater than c.

Figure 6B:
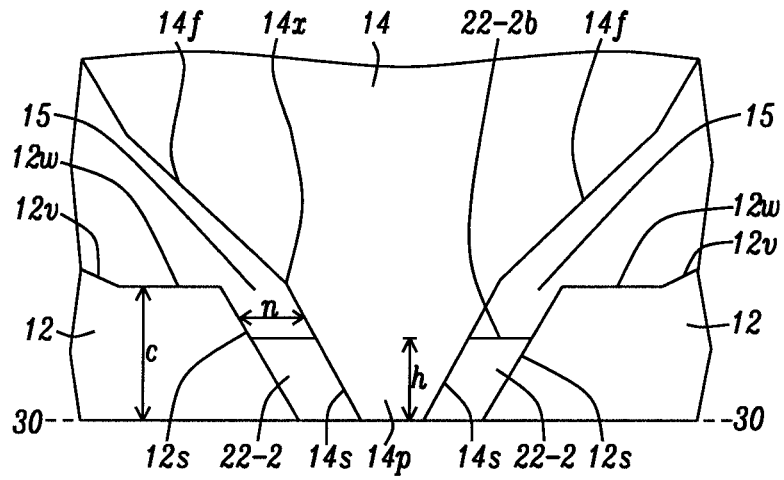
FIG. 6B is a top-down view of the MAMR writer in FIG. 5B where the trailing shield structure and overlying layers have been removed to show the side gaps and side shields.

FIG. 6B illustrates a top-down view of SS 12, STO 22-2, and MP 14 in FIG. 5B with overlying layers removed. All layers are retained from the PMR writer in FIG. 6A except the STO is formed in each SG 15, and extends from the ABS 30-30 to a backside 22-2b at height h where h is generally less than c. Although the STO provides a spin flipping effect to increase reluctance in the SG during a write process, there is excessive wear on a front side of the STO at the ABS because of write head touchdowns during multiple write processes.

Figure 6C:
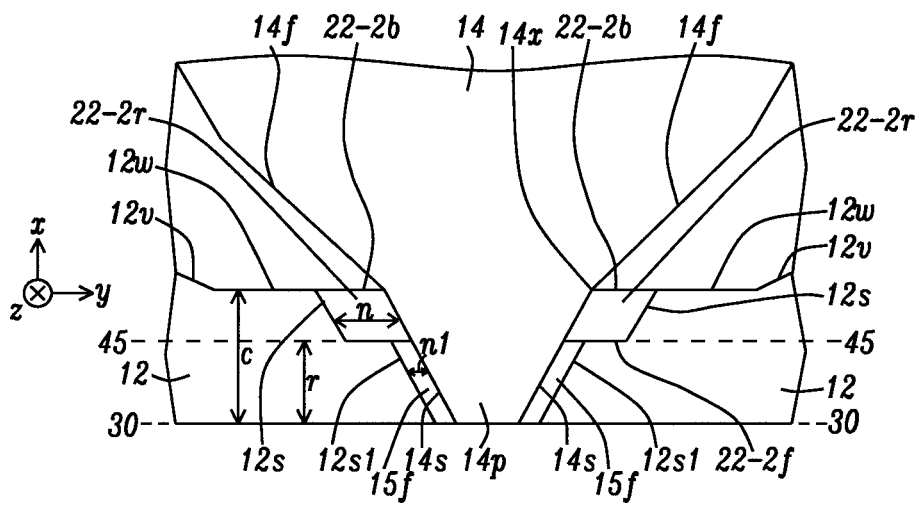
FIG. 6C is a top-down view of the PMR writer in FIG. 5C where the trailing shield structure and overlying layers are removed to show a recessed STO in a back portion of each SG, and a smaller SG front portion at the ABS.

In FIG. 6C, a top-down view of the SS 12, MP 14, and recessed STO 22-2r of the MAMR writer in FIG. 5C is shown according to a first embodiment of the present disclosure. Each SG now has a front portion 15f from the ABS 30-30 to height r that has a reduced width n1 compared with the width n in a SG back portion that is filled with STO 22-2r from a front side 22-2f at height r to a backside 22-2b at height c. Backside 22-2b coincides with a portion of SS side 12w described previously. Thus, STO height h=(c−r), which means (h+r)=c. However, the present disclosure also encompasses other embodiments where (h+r)<c. Accordingly, each SS has a first inner side 12s1 from the ABS to height r, and a second inner side 12s from height r to height c where the second inner side is a greater distance from MP side 14s than the first inner side. Plane 45-45 is at height r and is parallel to the ABS.

Figure 7A:
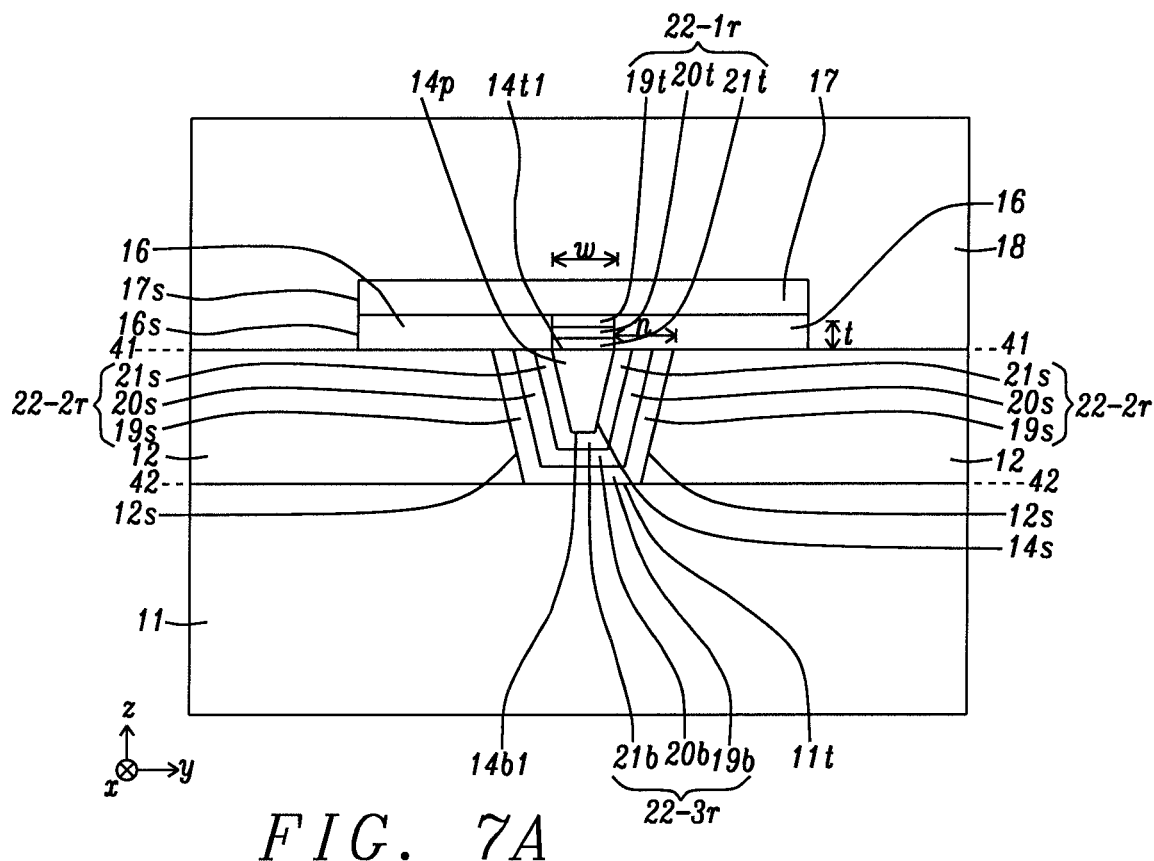
FIG. 7A is a view from a plane parallel to and recessed behind the ABS according to a first embodiment of the present disclosure where a recessed STO is formed in each of the write gap, side gaps, and leading gap.

FIG. 7A is a view at plane 45-45 in FIG. 6C for a first embodiment where recessed STO 22-1r, STO 22-2r, and STO 22-3r are formed in the WG, SG, and LG, respectively. FGL 20b in STO 22-3r may form a continuous FGL layer with FGL 20s in each STO 22-2r. Likewise, spin preserving layer 19b in STO 22-3r and spin preserving layer 19s in each STO 22-2r may form a continuous spin preserving layer, and non-spin preserving layers 21b and 21s in STO 22-3r and 22-2r, respectively, may form a continuous non-spin preserving layer.

Figure 7B:
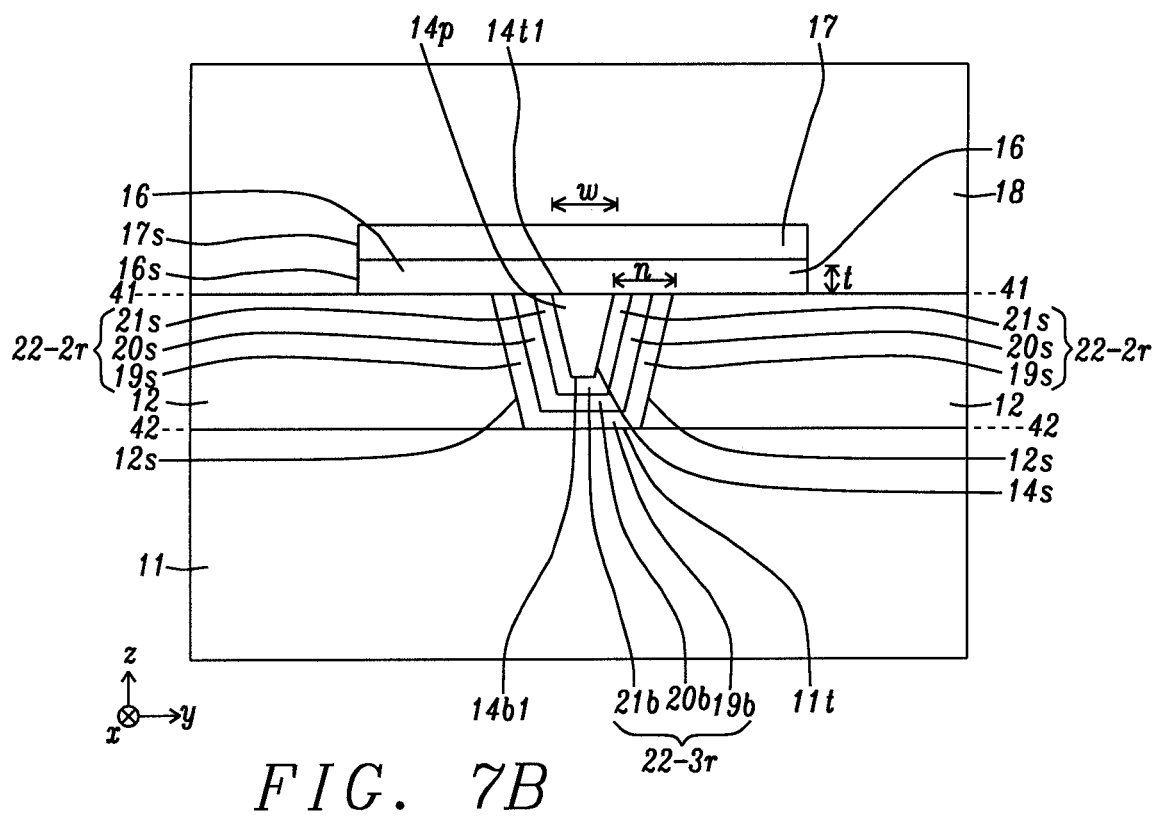
FIG. 7B is a view from a plane parallel to and recessed behind the ABS according to a second embodiment of the present disclosure where a recessed STO is formed in each of the side gaps, and leading gap.

In FIG. 7B, a second embodiment of the present disclosure is depicted that is a modification of the first embodiment. In particular, STO 22-1r is omitted while STO 22-2r on each side of center plane 44-44, and STO 22-3r are retained from the previous embodiment. The view is at plane 45-45 in FIG. 6C.

Figure 7C:
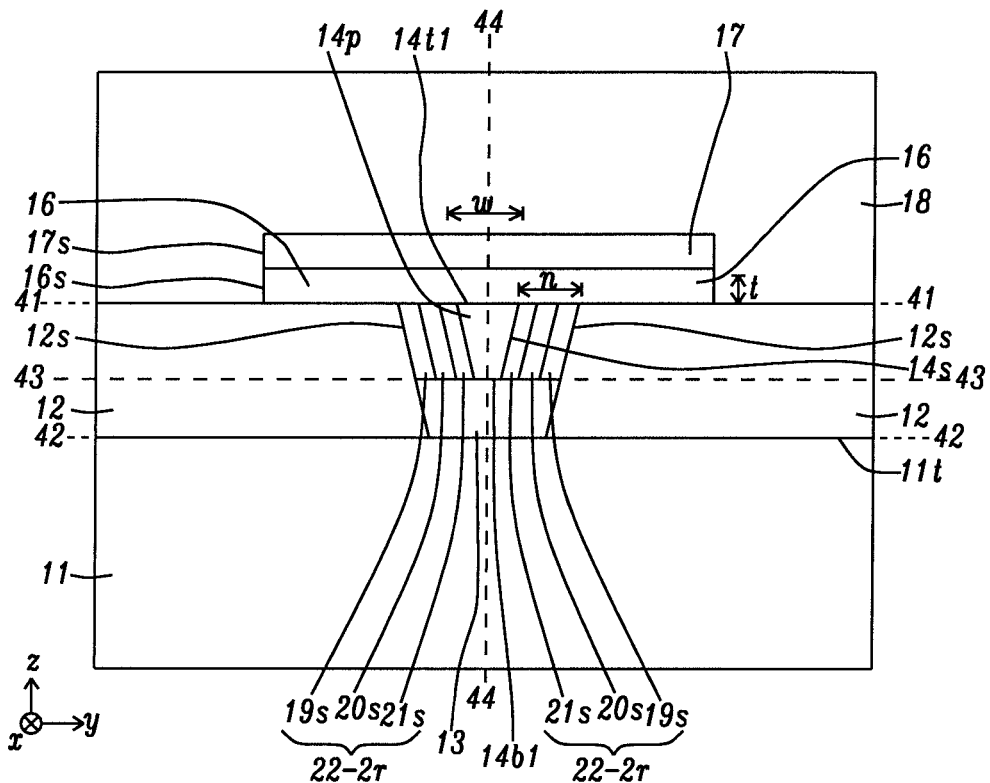
FIG. 7C is a view from a plane parallel to and recessed behind the ABS according to a third embodiment of the present disclosure where a recessed STO is formed in each of the side gaps.

FIG. 7C illustrates a third embodiment of the present disclosure where STO 22-3r is omitted from the second embodiment so that only STO 22-2r remains on each side of center plane 44-44. Each STO 22-2r extends in a down-track direction from plane 41-41 to plane 43-43 that is parallel to plane 41-41 and comprises MP leading side 14b1 at the ABS. STO 22-2r has a cross-track width n between MP side 14s and an inner SS side 12s. LG 13 is formed between plane 43-43 and LS top surface 11t that is at plane 42-42.

Figure 8A:
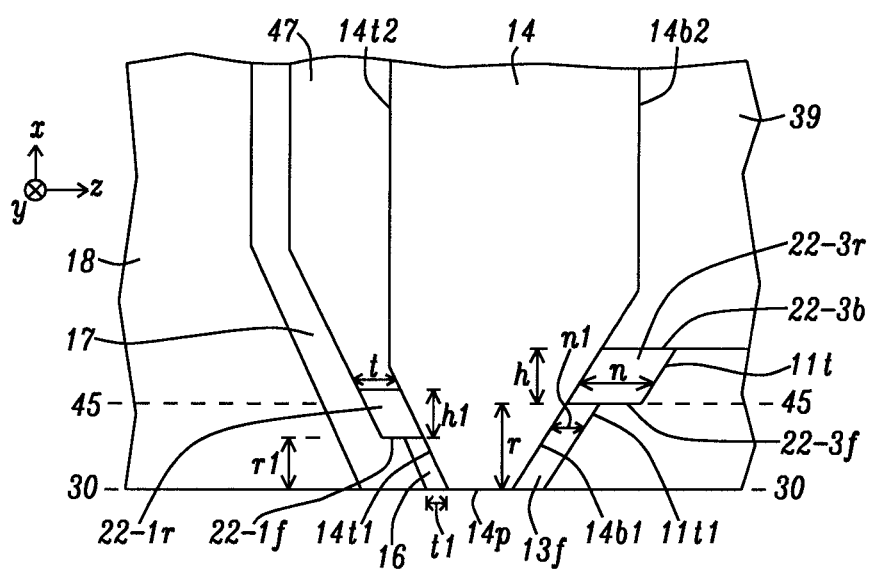
FIG. 8A is a down-track cross-sectional view of the embodiment in FIG. 6C where a first recessed STO is formed in the WG, and second and third recessed STOs are formed in the SG and LG, respectively, and the second and third STOs are recessed the same height from the ABS.

Referring to FIG. 8A, the down-track cross-sectional view at center plane 44-44 in FIG. 5C is illustrated for the embodiment in FIG. 7A where a continuous STO structure comprised of recessed STO 22-2r and recessed STO 22-3r is formed in each SG 15 and in LG 13, respectively, and where a recessed STO 22-1r is in the WG 16. MP leading side 14b1 is tapered and connects with MP bottom surface 14b2 that is aligned orthogonal to the ABS 30-30, and formed on dielectric layer 39. Moreover, top surfaces 11t and 11t1 of LS 11 may be substantially parallel to the tapered MP leading side. The MP trailing side 14t1 is also tapered and connects with MP top surface 14t2 that is parallel to the MP bottom surface. Dielectric layer 47 fills a gap between HS layer 17 and the MP top surface. It should be understood that other leading shield and trailing shield designs are compatible with the flux guiding element aspect of the present disclosure. Thus, the embodiments of the present disclosure are not limited to the surrounding shield designs including the leading shield, trailing shield, and side shield shapes described herein.

Recessed STO 22-3r is formed in a back portion of the LG that has thickness n. A front LG portion 13f that extends from the ABS 30-30 to plane 45-45 has a reduced thickness n1 (n1<n). STO front side 22-3f is recessed to height r at plane 45-45, and a backside 22-3b is at a height (h+r). As a result, LS top surface 11t1 that adjoins the LG front portion is closer to the MP tapered trailing side 14b1 than LS top surface 11t that adjoins STO 22-3r. In the exemplary embodiment, recessed STO 22-1r is formed in a WG back portion having a greater thickness t1 than thickness t in a WG front portion 16 that extends from the ABS to the STO front side 22-1f at height r1. STO 22-1r has height h1 where h1 may be unequal to h. Likewise, recessed height r1 may be unequal to r. Note that r1<r in the exemplary embodiment. Preferably, r and r1 are from 2 nm to 400 nm, and each of t1, n, and n1 is from 1 nm to 100 nm. Heights h and h1 range from 10 nm to 500 nm.

Figure 8B:
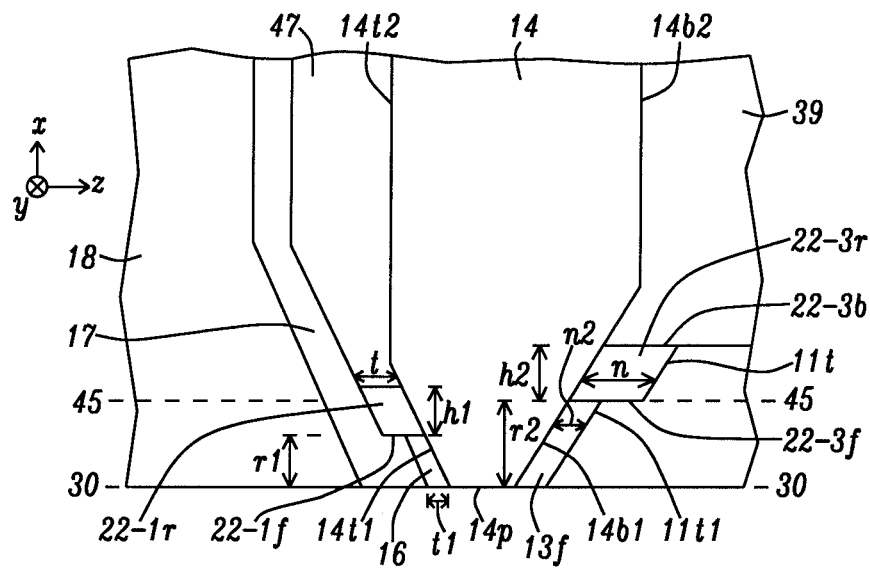
FIG. 8B is a down-track cross-sectional view of the embodiment in FIG. 6C where a first recessed STO is formed in the WG, and second and third recessed STOs are formed in the SG and LG, respectively, and each of the first, second, and third STOs are recessed a different height from the ABS.

In another embodiment depicted in FIG. 8B, STO 22-3r in the LG may have a front side 22-3f recessed to a height r2 that is different from the recessed height r of STO 22-2r in the SG. Accordingly, FGL 20t and FGL 20b do not necessarily form a continuous layer adjacent to MP side 14s and MP leading side 14b1, respectively. Likewise, spin preserving layers 19t, 19s may not form a continuous spin preserving layer, and non-spin preserving layers 21t, 21s may not form a continuous non-spin preserving layer. Height h2 of STO 22-3r may be unequal to h1 in STO 22-1r and unequal to h in STO 22-2r. Similarly, LG thickness n2 at the ABS 30-30 may be unequal to SG width n1, and unequal to WG thickness t1 at the ABS. Obviously, the recessed STO structure where h1 is unequal to h2 requires more fabrication steps to form than in the previous embodiment shown in FIG. 8A.

A top-down view of a recessed STO in the WG is provided in related U.S. Pat. No. 10,446,178 and shows the STO shape may be a rectangle or trapezoid. Furthermore, the STO may have sufficient cross-track width such that the STO sides overlay on a portion of each MP side. A method of forming a recessed STO in the WG is also provided. A method of forming the recessed STO structure in the SG and LG will be described in a subsequent disclosure.

In all embodiments, WG thickness t at the ABS is preferably from 5 nm to 30 nm. Non-spin preserving layers 21t, 21s, 21b are typically a metal such as Ta, W, Pt, Ru, Ti, or Pd. Each FGL 20t, 20s, 20b is a magnetic layer that is usually a single layer or multilayer comprised of $Ni_xFe_{100-x}$, $Co_yFe_{100-y}$, $Co_zNi_{100-z}$, or alloys thereof with one or more additional elements that are B, Mo, W, Pt, Pd, or Cr, and where each of x, y, and z is ≥0 atomic % and ≤100 atomic %. Each spin preserving layer 19t, 19s, 19b is a conductive layer and is preferably comprised of Cu, Ag, Au, Al, or Cr.

There are several advantages associated with the recessed STO structure described herein. With regard to recessed STO 22-2r, width n is independent of width n1 in the SG front portion unlike STO 22-2 at the ABS in FIG. 5B where STO width is typically equal to SG width n. Thus, a thicker STO can be realized with different Ms values for the FGL layer 20s. In other words, higher STO Mst and smaller gap size at the ABS up to recessed height r (and r1 in the WG) can coexist in the MAMR writer design disclosed herein. As a result, higher STO Mst than in the prior art is able to compensate for OW loss from smaller gap size thereby leading to a net gain of write field gradient around the MP. Since width n1<n, the smaller SG front portion enables better TPI and adjacent track interference (ATI). Furthermore, SS perpendicular height c in FIG. 6C may be increased for enhanced SS support with little or no OW loss. Meanwhile, WG thickness t at the ABS can be reduced while maintaining a greater STO 22-1r thickness where t>t1 to allow better BPI while the STO helps OW from being degraded. Finally, there is considerably less concern of STO wear because the front sides of STO 22-1r, STO 22-2r, and STO 22-3r are all recessed behind the ABS.

In order to demonstrate the benefits of a recessed STO design according to an embodiment of the present disclosure, a finite element modeling (FEM) simulation based on Maxwell's equation has been performed for the previously disclosed MAMR writer (FIG. 5B, FIG. 6B), and for the MAMR writer disclosed herein (FIG. 5C, FIG. 6C, and FIG. 7A). STO FGL Ms is set at 6 kiloGauss (kG), height h for the recessed STO in the SG and LG, and h1 for the recessed STO in the WG are both 50 nm, recessed heights r and r1 are both 50 nm, and WG gap thickness t, SG width n, and LG thickness n are each 35 nm. The front portions of the SG and LG (below the recessed height of 50 nm) according to the MAMR writer of the present disclosure have a thickness n1 that is swept from 5 nm to 35 nm with a step size of 5 nm.

Figure 9:
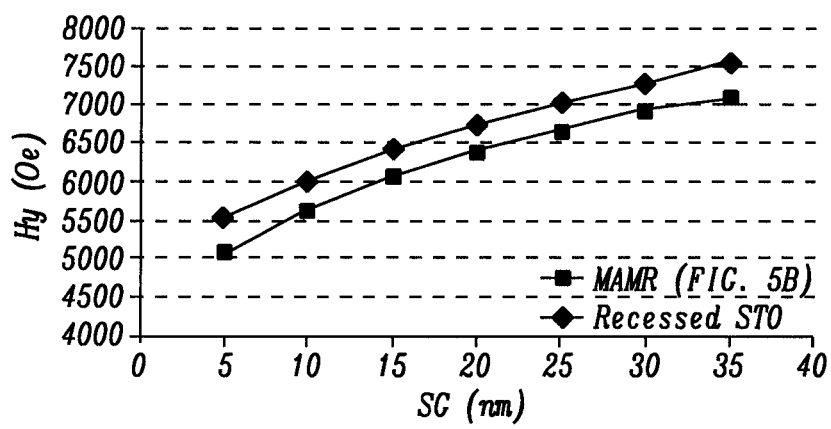
FIG. 9 is a plot of Hy field vs. SG width for the PMR writer in FIG. 5A, and for a MAMR writer with recessed STO in the SG and LG according to an embodiment of the present disclosure.

FIG. 9 is a plot of Hy field as a function of the size in the SG/LG front portions, and results show that the MAMR writer having a recessed STO in the WG, SG, and LG according to an embodiment of the present disclosure provides a similar Hy of about 7100 Oe with n1=25 nm in the SG front portion and t1=17 nm in the WG front portion compared with the previously disclosed MAMR writer (FIG. 5B) with n=35 nm in the SG and t=17 nm in the WG.

Figure 10:
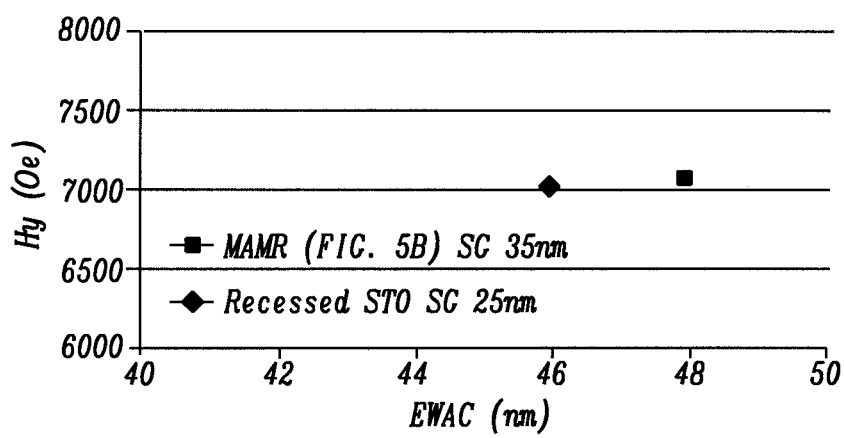
FIG. 10 is a plot of Hy field vs. erase width in alternating current (AC) mode for the PMR writer in FIG. 5A with a 35 nm SG, and for a MAMR writer with a recessed STO in a SG back portion while a front SG portion has a 25 nm width.

In FIG. 10, Hy is plotted vs. erase width under AC mode (EWAC) for the MAMR writer of the present disclosure with a 25 nm cross-track width in the SG front portion mentioned above, and for the previously disclosed MAMR writer having a 35 nm SG width. At a Hy of around 7000 Oe, EWAC is 2 nm narrower for the MAMR writer of the present disclosure, which means that TPI may be improved as much as 4% without sacrificing BPI or OW.

Figure 11:
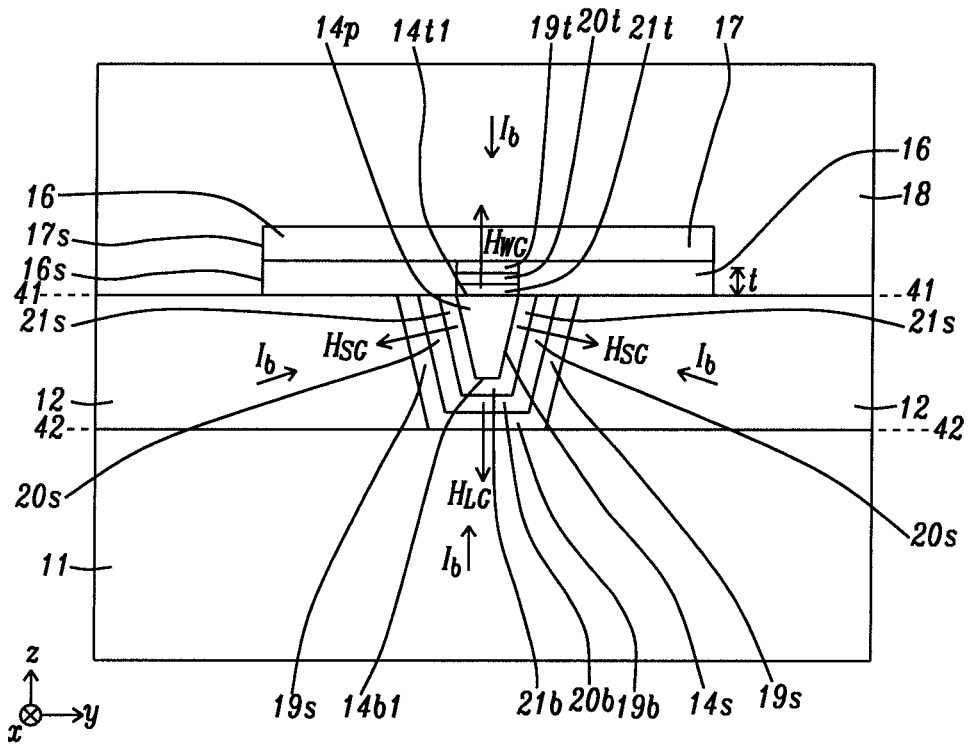
FIG. 11 is a view from a plane recessed from and parallel to the ABS that depicts multi-directional gap fields ($H_{WG}$, $H_{SG}$, $H_{LG}$), and an applied current oriented opposite to the gap field on each side of the main pole according to an embodiment of the present disclosure.

FIG. 11 relates to an embodiment of the present disclosure described earlier with respect to FIG. 7A where there is a view of the STO structure in the gap surrounding the MP 14 at plane 45-45. Directional arrows are provided for the WG field ($H_{WG}$), the SG field ($H_{SG}$), and the LG field ($H_{LG}$). During a write process, current $I_b$ may be applied from HS layer 17 across the WG 16 to MP 14, from each SS 12 across SG 15 to the MP, and from LS 11 across the LG 13 to the MP. In each case, the applied current is substantially opposed to the gap field. As mentioned previously, in embodiments where the spin preserving layer 19t, 19s, or 19b is switched with the non-spin preserving layer 21t, 21s, or 21b, respectively, the applied current is directed from the MP to each surrounding shield in order for spin torque to be generated on FGL 20t, 20s, and 20b that is sufficient to cause FGL magnetization in each STO to flip to an opposite direction (toward the MP) thereby reducing the corresponding gap fields $H_{WG}$, $H_{SG}$, and $H_{LG}$, respectively. In order for the STOs to have acceptable reliability, current density for $I_b$ must be maintained as low as possible, since excessive current may cause degradation of one or more layers in the STO elements due to electromigration and/or excessive local heating.

Figure 12:
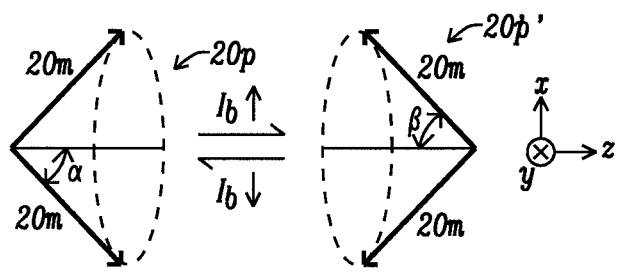
FIG. 12 depicts a precessional state in a FGL magnetization within a recessed STO of the present disclosure where the FGL magnetization may flip to an opposite direction when the applied current has sufficient current density.

Referring to FIG. 12, the left side of the drawing depicts FGL magnetization 20m in FGL 20t, for example, that has been driven into a precessional state 20p having a cone angle α when applied current $I_b$ has a first range of current density and is spin polarized to produce sufficient spin torque on the FGL. As the cone angle increases with increasing current density, the RF field (MAMR effect) on a bit magnetization (not shown) proximate to the ABS also increases. At some point, when $I_b$ is increased to a current density in a second range that is about $1 \times 10^{-7}$ to $1 \times 10^{-9}$ Amp/cm², FGL magnetization 20m flips to an opposite direction (toward the MP) and enters a precessional state 20p' that has cone angle β. As current density increases in the second range, cone angle β becomes increasingly smaller. In precessional state 20p', the MAMR effect decreases with increasing current density. However, as cone angle β decreases, reluctance in the WG increases meaning that $H_{WG}$ is increasingly reduced until $H_{WG}$ reaches a minimum value when β=0 degrees.

A similar response occurs for FGL magnetization 20m in FGL 20s and FGL 20b when current $I_b$ is applied across the SG and LG, respectively. In each case, FGL magnetization is driven into precessional state 20p in a first range of $I_b$ current density, and is driven into precessional state 20p' at the second (higher) range of $I_b$ current density. It should be understood that FGL magnetization 20m may not flip in each of FGL 20t, 20s, and 20b at the same level of current density for $I_b$ because of variations in STO dimensions (height and width/thickness) and in recessed height. Thus, the reduction in each of $H_{WG}$, $H_{SG}$, and $H_{LG}$ in FIG. 11 may be different at the same current density for $I_b$ in the WG, SG, and LG, respectively.

Figure 13:
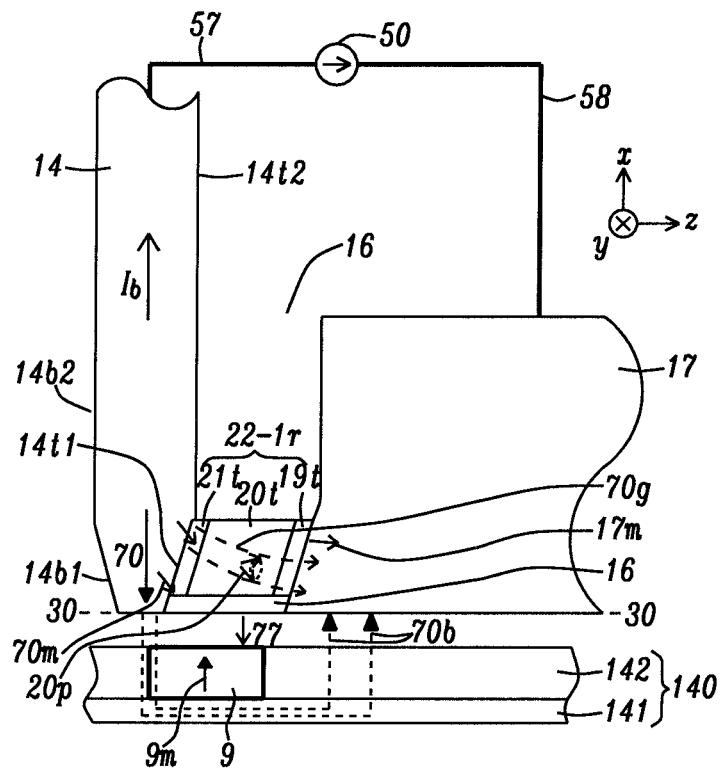
FIG. 13 is a down-track cross-sectional view of a MAMR writer according to the present disclosure wherein a recessed STO in a WG has a precessional state that generates a RF field on a bit magnetization in a magnetic medium.

Referring to FIG. 13, a portion of a MAMR writer surrounding STO 22-1r in WG 16 is depicted, and shows FGL 20t driven into precessional state 20p because of applied current $I_b$ from HS layer 17 to MP 14. The applied current is supplied from source 50 through lead 58 to the HS layer, and returns from the MP to the source through lead 57. The HS layer has magnetization 17m proximate to spin preserving layer 19t that is oriented generally away from the MP. The MP has magnetization 70m proximate to MP tapered trailing side 14t1. $H_{WG}$ 70g is in the general direction from the MP to the HS layer, and across the STO. Magnetic flux 70 in the MP proceeds through the ABS 30-30 and into medium bit layer 142 and soft underlayer (SUL) 141 in magnetic medium 140. A portion of the flux 70b is collected by the HS layer 17 and then returns to the MP through a trailing loop described previously. When the applied current is sufficiently large, RF field 77 is generated on magnetic bit 9 in magnetic medium 140 thereby lowering coercivity in bit magnetization 9m, which in turn reduces the MP field 70 needed to switch the magnetic bit, and other magnetic bits (not shown) during a write process.

Figure 14:
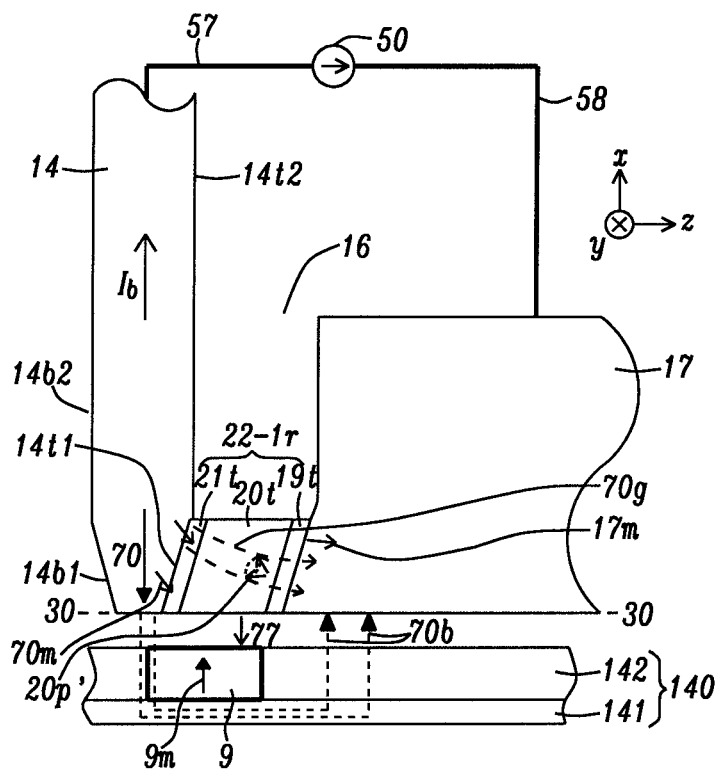
FIG. 14 is a down-track cross-sectional view of the MAMR writer in FIG. 13 after an applied current with sufficient density flips FGL magnetization to a direction substantially opposite to the WG field flux.

As shown in FIG. 14, when the applied current $I_b$ becomes sufficiently large, the FGL moment 20m flips to a direction substantially opposite to $H_{WG}$ and enters precessional state 20p' described previously. The mechanism is based on the behavior of electrons with spins parallel and anti-parallel to magnetization 17m in HS layer 17. The portion of electrons having a moment that is parallel to magnetization 17m are able to enter the HS layer with very little resistance. However, electrons with a moment that is anti-parallel to magnetization 17m do not enter the HS layer easily because of less unoccupied states in the HS layer, and are back scattered back to FGL 20t. As a result, a spin torque is exerted on FGL magnetization. Accordingly, the FGL moment is flipped and is primarily oriented toward the MP trailing surface 14t1. Thus, there is a greater reluctance in the WG, which means that $H_{WG}$ 70g across WG 16 is reduced and forces additional magnetic flux 70 into the magnetic recording medium 140. In some embodiments where cone angle β (FIG. 12) is sufficiently larger than 0 degrees, there is not only a reduction in $H_{WG}$, but also a RF field 77 is produced by precessional state 20p' and causes bit magnetization 9m in magnetic bit 9 to enter a precessional state (not shown) thereby lowering coercivity therein and reducing the MP field 70 necessary to switch the bit magnetization.

In addition to the benefits mentioned previously for a recessed STO in one or more of the WG, SG, and LG, each recessed STO described herein and shown in FIG. 11 provides the advantage of reducing one of the gap fields ($H_{WG}$, $H_{SG}$, and $H_{LG}$) between MP 14 and an adjacent shield structure, as well as the capability to produce a RF field (MAMR effect) on a bit magnetization when the applied current $I_b$ is within a certain range of current density. Accordingly, the critical current that is used to produce MP field 70 is reduced to improve write performance.

The present disclosure also anticipates that other STO configurations may be employed rather than the non-spin preserving layer/FGL/spin preserving layer stack described previously. For example, in related U.S. Pat. No. 10,490, 216, a STO is disclosed where two spin polarization layers apply spin torque to a FGL from opposite sides to reduce the applied current density needed for spin flipping.

Figure 15:
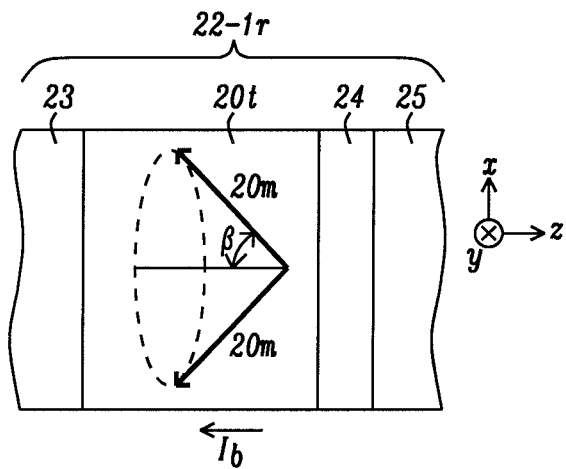
FIG. 15 and FIG. 17 depict other embodiments of a MAMR writer according to the present disclosure wherein a STO comprises at least a FGL, a spin polarization (SP) layer, and a non-magnetic spacer between the FGL and SP layer, and where a current is applied across the STO in a direction from the SP layer to the FGL.

Referring to FIG. 15, another STO configuration is illustrated that may be used in a MAMR writer according to an embodiment of the present disclosure. In the exemplary embodiment, recessed STO 22-1r in the WG has FGL 20t that was described earlier. There is a first non-magnetic spacer (NM1) 23 on a first side of the FGL and a second non-magnetic spacer (NM2) 24 on a second side of the FGL. Spin polarization (SP) layer 25 adjoins NM2 on a side thereof that is opposite to the FGL to give a NM1/FGL/NM2/SP configuration. In some embodiments, NM1 contacts the MP (not shown) and the SP layer contacts the HS layer (not shown). FGL has a precessional state wherein magnetization 20m flips to a direction pointing toward the MP trailing side when applied current $I_b$ has sufficient density and is directed across the STO in a direction from the HS layer to MP. The SP layer may be comprised of one of the magnetic materials mentioned previously with respect to FGL 20t, FGL 20s, and FGL 20b, and generates spin torque on the FGL in the presence of $I_b$ to cause FGL flipping to a precessional state with cone angle 3. NM1 23 and NM2 24 may be single layer or multilayer films as appreciated by those skilled in the art, and are preferably a non-magnetic metal with a long spin diffusion length such as Cu, Ag, or Au that serve as a spin preserving layer so that current polarized by the adjacent SP layer 25 does not encounter strong spin-flip scattering in the spacers.

Figure 16A:
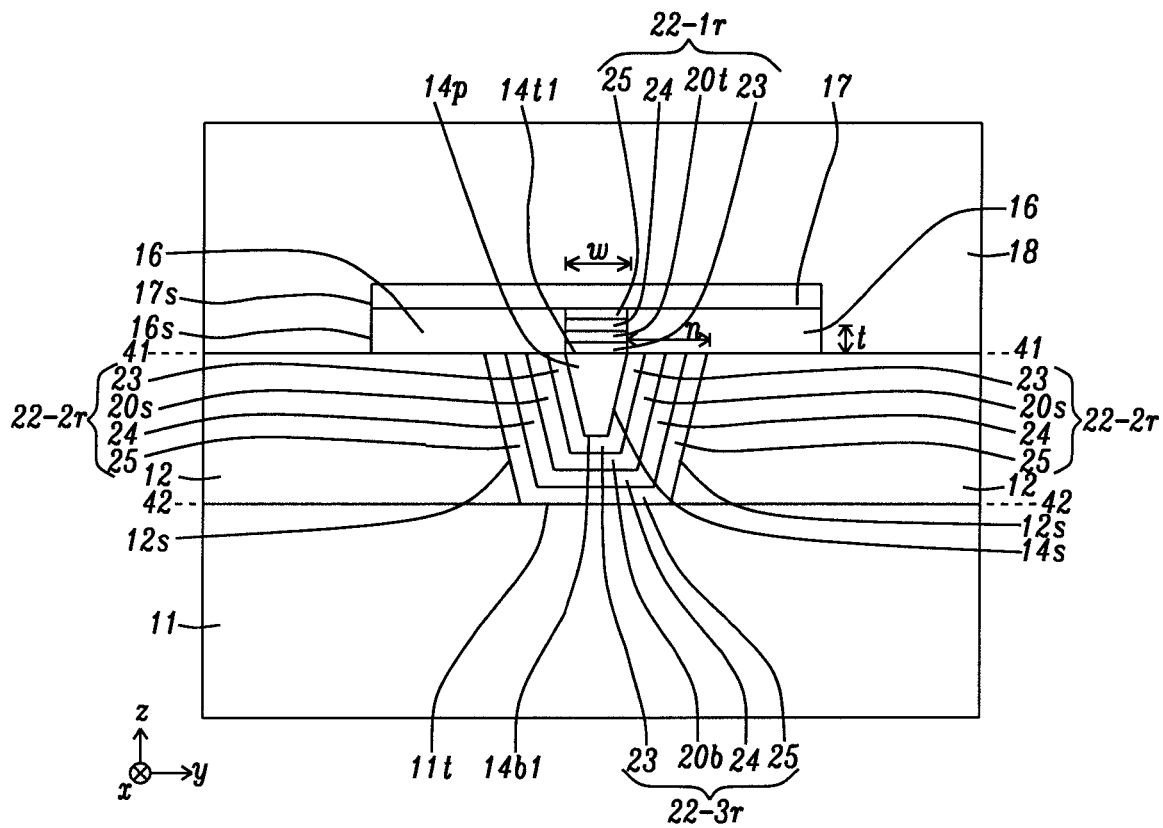
FIGS. 16A-16C are modifications of the embodiments in FIGS. 7A-7C, respectively, where one or more recessed STO configurations have a four layer stack comprising a FGL and SP layer rather than a three layer stack.

According to another embodiment of the present disclosure shown in FIG. 16A, the MAMR writer structure in FIG. 7A may be modified to replace each 21s/20s/19s stack of layers in recessed STO 22-2r, the 21t/20t/19t stack in recessed STO 22-1r, and the 21b/20b/19b stack in recessed STO 22-3r with the NM1/FGL/NM2/SP configuration that is a 23/20s/24/25 stack, 23/20t/24/25 stack, and 23/20b124/25 stack, respectively. Thus, STO 22-2r now has an inner NM1 layer 23 adjoining a side of MP 14s and an outer SP layer 25 contacting a SS side 12s. Also, STO 22-1r now has an inner NM1 layer 23 adjoining MP trailing side 14t1 and an outer SP layer 25 contacting HS layer 17. STO 22-3r has the inner NM1 layer 23 adjoining MP leading side 14b1 and the outer SP layer 25 contacting LS top surface 11t. Note that STO recessed height (not shown), width n in the SG, and thickness n or t in the LG and WG, respectively, are retained from the previous embodiments. In some embodiments, FGL 20s and FGL 20b form a continuous FGL layer while each of NM1, NM2, and the SP layer is a continuous layer from STO 22-2r to STO 22-3r. However, it should be understood that NM1 in STO 22-2r may not form a continuous layer with NM1 in STO 22-3r if the recessed heights of the aforementioned STOs are not equal. Similarly, NM2, FGL 20s, and the SP layer in STO 22-2r may not form a continuous layer with NM2, FGL 20b, and the SP layer, respectively, in STO 22-3r depending on the recessed height of each STO.

Figure 16B:
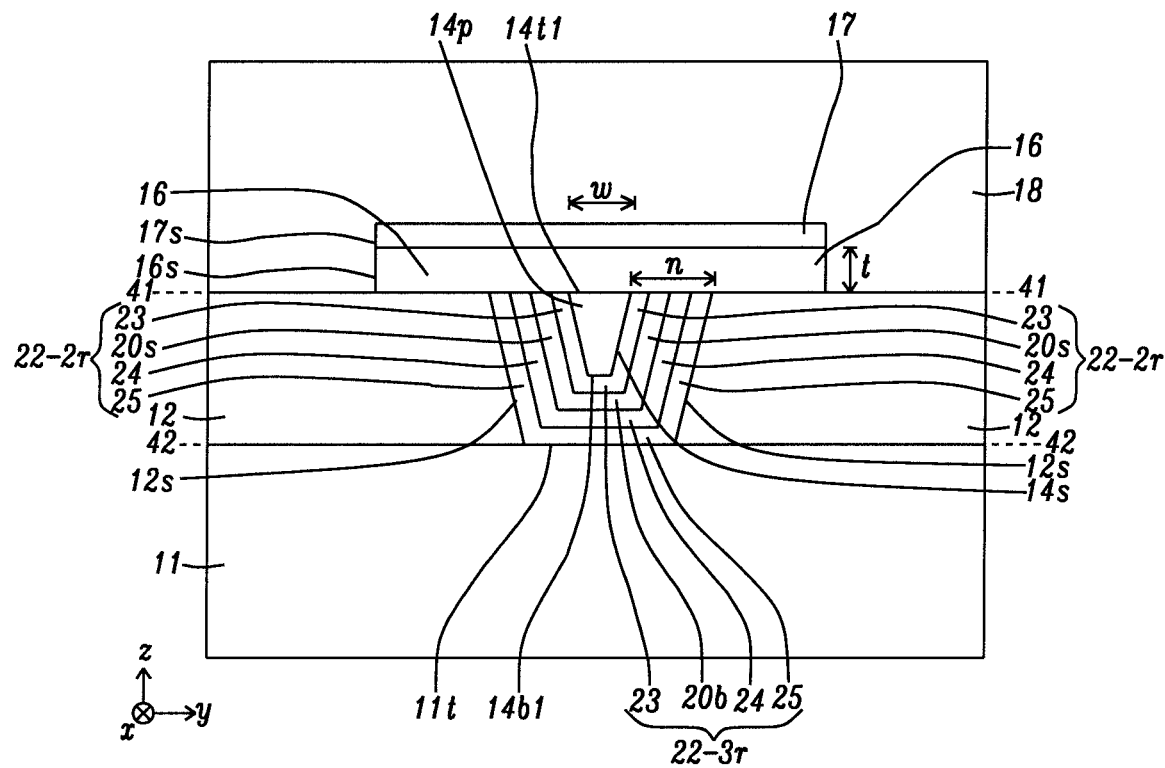
Figure 16C:
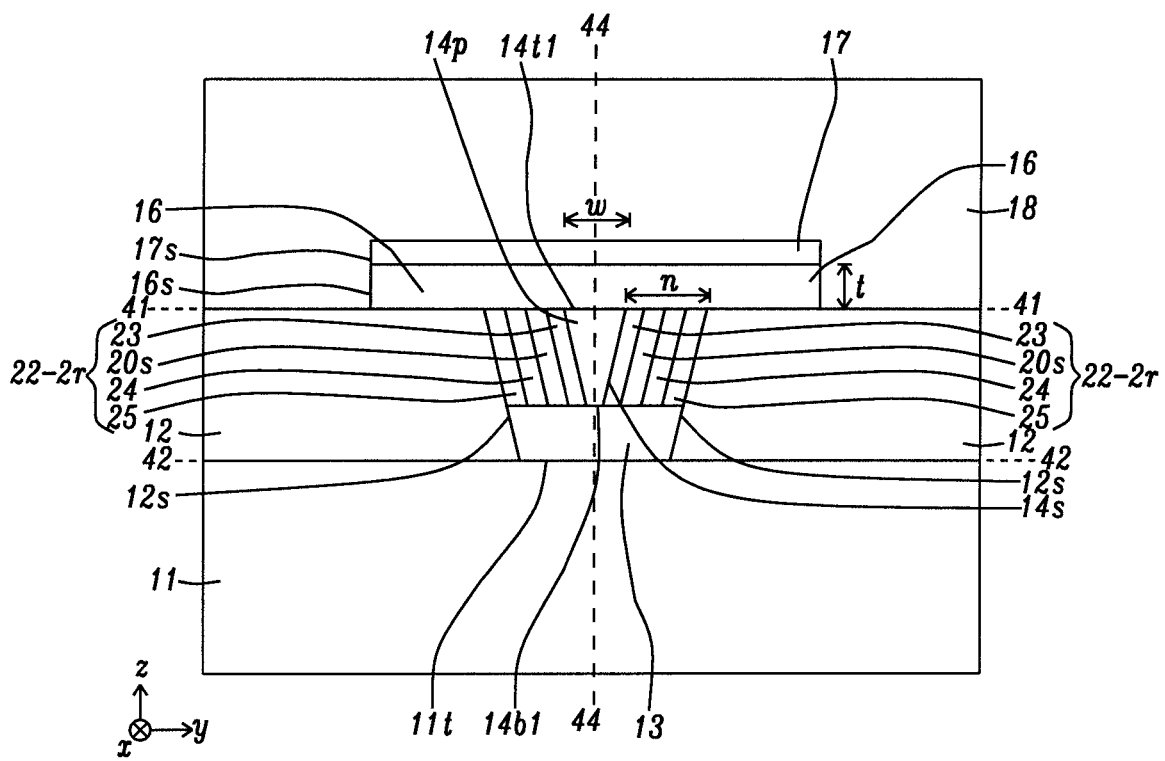

Referring to FIG. 16B, the MAMR writer structure in FIG. 16A is retained with the exception of omitting recessed STO 22-1r. As a result, WG 16 is formed on the MP trailing side 14t1 as in a conventional PMR writer. Moreover, as indicated in FIG. 16C, both of STO 22-1r and STO 22-3r in FIG. 16A may be omitted to provide only STO 22-2r in each SG between MP side 14s and SS 12.

Figure 17:
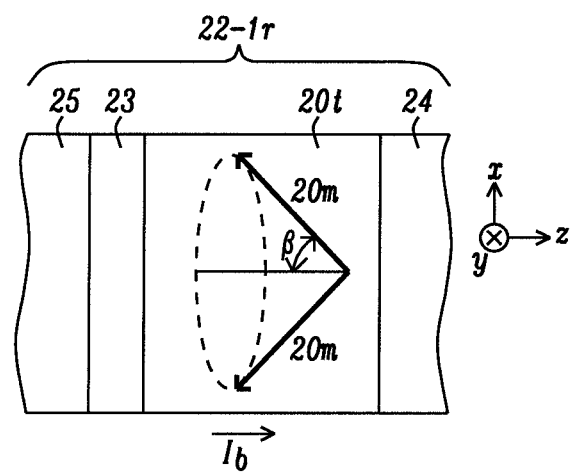

Referring to FIG. 17, the STO configuration in FIG. 15 may be modified to give a SP/NM1/FGL/NM2 configuration for STO 22-1r where SP layer 25 contacts the MP (not shown) and NM2 24 is the uppermost STO layer and contacts the HS layer (not shown). Applied current $I_b$ is directed across STO 22-1r from the MP to the HS layer so that spin torque from the SP layer is able to flip FGL magnetization 20m to point generally in the −z axis direction toward the MP. Accordingly, the stack of layers in STO 22-2r in FIGS. 16A-16C may be reconfigured to yield a 25/23/20s/24 stacking order on each MP side 14s. Moreover, STO 22-3r in FIGS. 16A-16B may be reconfigured to provide a 25/23/20b/24 stacking order on LS top surface 11t.

While the present disclosure has been particularly shown and described with reference to, the preferred embodiment thereof, it will be understood by those skilled in the art that various changes in form and details may be made without departing from the spirit and scope of this disclosure.

We claim:

1. A microwave assisted magnetic recording (MAMR) writer, comprising:
   (a) a main pole (MP) with a leading side and a trailing side, the leading side adjoins a leading gap at an air bearing surface (ABS), and the trailing side has a track width and adjoins a write gap at the ABS;
   (b) a side gap which contacts a side of the main pole formed between the trailing side and leading side on each side of a center plane that is equidistant from each main pole side;
   (c) the leading gap that adjoins a bottom portion of each side gap and contacts the leading side of the main pole;
   (d) a shield structure comprising a first trailing shield (TS) that is a hot seed (HS) layer on the write gap, a side shield contacting each side gap, and a leading shield adjoining a bottom surface of the leading gap; and
   (e) a first spin torque oscillator (STO) formed in at least each side gap, and wherein each first STO is recessed a first height from the ABS, and comprises:
      (1) an inner non-spin preserving layer that contacts the main pole;
      (2) a middle flux guiding layer (FGL) configured to have a magnetization that is driven into a precessional state when a current $I_b$ of sufficient magnitude is applied in a direction from the shield structure towards the main pole, the precessional state is responsible for a reduction in magnetic flux between at least the MP and the side shields; and
      (3) an outer spin preserving layer on an opposite side of the FGL with respect to the inner non-spin preserving layer.

2. The MAMR writer of claim 1 further comprised of a second STO that is formed in the leading gap and recessed a second height from the ABS; comprising:
   (a) an inner non-spin preserving layer that contacts the leading side of the main pole;
   (b) a middle FGL configured to have a magnetization that is driven into a precessional state when a current $I_b$ of sufficient magnitude is applied in a direction from the leading shield towards the main pole, the precessional state is responsible for a reduction in magnetic flux between the MP and the leading shield; and
   (c) an outer spin preserving layer.

3. The MAMR writer of claim 2 further comprised of a third STO formed in the write gap, and that is recessed a third height from the ABS, and wherein a middle FGL is formed between an inner non-spin preserving layer and an outer spin preserving layer, and is configured to have a magnetization that is driven into a precessional state when a current $I_b$ of sufficient magnitude is applied from the HS layer to the MP, the precessional state is responsible for a reduction in magnetic flux between the MP and HS layer.

4. The MAMR writer of claim 3 wherein each of the first STOs, second STO, and third STO are recessed 2 nm to 400 nm from the ABS.

5. The MAMR writer of claim 3 wherein each of the first STOs, second STO, and third STO has a height between a front side and a backside thereof from 10 nm to 500 nm.

6. The MAMR writer of claim 3 wherein the second height is unequal to the first height, and unequal to the third height.

7. The MAMR writer of claim 2 wherein the first height is equal to the second height, and wherein the middle FGL in the first STOs and second STO form a continuous FGL, the outer spin preserving layers in the first STOs and second STO form a continuous spin preserving layer, and the inner non-spin preserving layers in the first STOs and second STO form a continuous non-spin preserving layer.

8. The MAMR writer of claim 1 wherein a width of the side gap between the ABS and a front side of each recessed first STO is from 1 nm to 100 nm, and is less than a width of each recessed first STO.

9. The MAMR writer of claim 1 wherein the FGL is single layer or multilayer comprised of one or more of $Ni_xFe_{100-x}$, $Co_yFe_{100-y}$, $Co_zN_{100-z}$, or alloys thereof with one or more additional elements that are B, Mo, W, Pt, Pd, or Cr, and where each of x, y, and z is $\geq 0$ atomic % and $\leq 100$ atomic %.

10. The MAMR writer of claim 1 wherein the outer spin preserving layer is a conductive layer that is one of Cu, Ag, Au, Al, or Cr.

11. The MAMR writer of claim 1 wherein the inner non-spin preserving layer is made of Ta, W, Pt, Ru, Ti, or Pd.

12. The MAMR writer of claim 1 wherein $I_b$ has a current density that is in a range of $1 \times 10^{-7}$ to $1 \times 10^{-9}$ Amp/cm$^2$.

13. A head gimbal assembly (HGA), comprising:
   (a) the MAMR writer of claim 1; and
   (b) a suspension that elastically supports the MAMR writer, wherein the suspension has a flexure to which the MAMR writer is joined, a load beam with one end connected to the flexure, and a base plate connected to the other end of the load beam.

14. A magnetic recording apparatus, comprising:
(a) the HGA of claim 12;
(b) a magnetic recording medium positioned opposite to a slider on which the MAMR writer is formed;
(c) a spindle motor that rotates and drives the magnetic recording medium; and
(d) a device that supports the slider, and that positions the slider relative to the magnetic recording medium.

* * * * *